US009891608B2

(12) United States Patent
Reichard et al.

(10) Patent No.: US 9,891,608 B2
(45) Date of Patent: Feb. 13, 2018

(54) PORTABLE HUMAN-MACHINE INTERFACE DEVICE

(71) Applicant: Rockwell Automation Technologies, Inc., Mayfield Heights, OH (US)

(72) Inventors: Douglas Reichard, Fairview Park, OH (US); Subbian Govindaraj, Solon, OH (US)

(73) Assignee: Rockwell Automation Technologies, Inc., Mayfeild Heights, OH (US)

( * ) Notice: Subject to any disclaimer, the term of this patent is extended or adjusted under 35 U.S.C. 154(b) by 341 days.

(21) Appl. No.: 14/680,325

(22) Filed: Apr. 7, 2015

(65) Prior Publication Data

US 2016/0299496 A1    Oct. 13, 2016

(51) Int. Cl.
*G05B 15/00* (2006.01)
*G05B 19/042* (2006.01)

(52) U.S. Cl.
CPC .. *G05B 19/042* (2013.01); *G05B 2219/24012* (2013.01); *G05B 2219/32128* (2013.01); *G05B 2219/37095* (2013.01)

(58) Field of Classification Search
CPC .................................................. G05B 19/042
See application file for complete search history.

(56) References Cited

U.S. PATENT DOCUMENTS

| | | | | |
|---|---|---|---|---|
| 2013/0291016 A1* | 10/2013 | Lazarski | .............. | H04N 5/4403 725/43 |
| 2015/0052557 A1* | 2/2015 | Hjelmstedt | ............ | H04N 5/445 725/39 |
| 2015/0235279 A1* | 8/2015 | Imamura | ............ | G06Q 30/0277 705/14.72 |
| 2015/0317591 A1* | 11/2015 | Pantaleano | ...... | G06Q 10/06393 705/7.39 |
| 2016/0072797 A1* | 3/2016 | Wilson | ................ | H04L 63/0892 726/9 |
| 2016/0192011 A1* | 6/2016 | Toh | ........................ | G06F 3/0481 725/37 |

* cited by examiner

*Primary Examiner* — Vincent Tran (57) ABSTRACT

Systems, methods, and software to facilitate management of industrial operations are disclosed herein. In at least one implementation, a portable HMI device is connected to a display system via a video interface, wherein the video interface provides interchangeability between a plurality of different display systems. A plurality of applications is stored in the portable HMI device. A remote navigation interface of the portable HMI device receives a selection transmitted from a remote navigation device, wherein the selection is associated with an industrial operation application of the applications displayed on the display system. The portable HMI device processes the selection of the industrial operation application and responsively executes the industrial operation application to communicate with an application server. A communication interface of the portable HMI device receives industrial operation data associated with the industrial operation application transmitted from the application server over a communication network for display on the display system.

20 Claims, 7 Drawing Sheets

PORTABLE HUMAN-MACHINE INTERFACE DEVICE

TECHNICAL FIELD

Aspects of the disclosure are related to computing hardware and software technology, and in particular to industrial automation applications.

TECHNICAL BACKGROUND

Industrial automation environments typically include various machines, such as drives, pumps, motors, and robots. Each machine continually produces operational data over time related to the performance of the machine, such as the machine's pressure, temperature, speed, and other metrics. Industrial environments also commonly include a Human-Machine Interface (HMI). An HMI typically receives and processes the status data from the machines to generate various graphical displays, which may indicate the current and historical performance of the machines. For example, an HMI graphical display might indicate status metrics of a drive, the pressure of a pump, the speed of a motor, or the output of a robot. The HMI may also provide a mechanism for an operator to send control instructions to a control system that controls the machines. For example, an operator might use the HMI to direct the control system to update drive parameters, turn on a pump, speed-up a motor, or stop a robot.

Existing HMI systems often require a user to operate an HMI by providing user input as physical touches directly into the HMI system, often requiring the use of a mouse, keyboard, touch screen, or similar input devices. Traditional HMI systems also commonly include a built-in display screen for displaying graphical content to the user.

OVERVIEW

Provided herein are systems, methods, and software to facilitate management of industrial operations. In at least one implementation, a portable HMI device is connected to a display system via a video interface, wherein the video interface provides interchangeability between a plurality of different display systems. A plurality of applications for display on the display system is stored in the portable HMI device. A remote navigation interface of the portable HMI device receives a selection transmitted from a remote navigation device, wherein the selection is associated with an industrial operation application of the applications displayed on the display system. The portable HMI device processes the selection of the industrial operation application and responsively executes the industrial operation application to communicate with an application server. A communication interface of the portable HMI device receives industrial operation data associated with the industrial operation application transmitted from the application server over a communication network for display on the display system.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for improved management, monitoring, and control of industrial operations from remote locations. In at least one implementation, a portable human-machine interface (HMI) device can be connected to general-purpose display systems such as modern high-definition televisions (HDTVs) and monitors. The portable HMI device typically has one or more applications stored thereon for display on the display system, enabling a user to navigate through and select among the applications using a remote navigation device, such as an infrared remote control, smartphone, tablet, or some other wireless device. In concert with a server, the applications on the portable HMI device can be executed to request and receive content for the portable HMI device to provide visualizations and control of various industrial automation operations. For example, the portable HMI device could receive and display key performance indicators (KPIs) related to operational data associated with machines in an industrial automation environment, such as parameters, pressures, temperatures, speeds, production rates, or some other status metrics. In some examples, the operational data for some KPIs may comprise dynamic charts or trends, real-time video, or some other graphical content.

Figure 1:
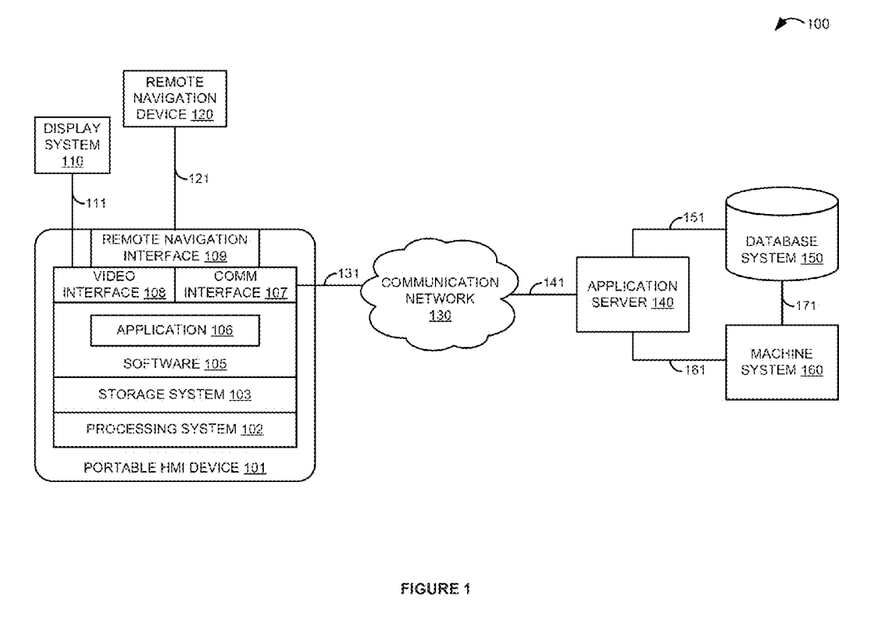
FIG. 1 is a block diagram that illustrates a communication system in an industrial automation environment in an implementation.
Figure 2:
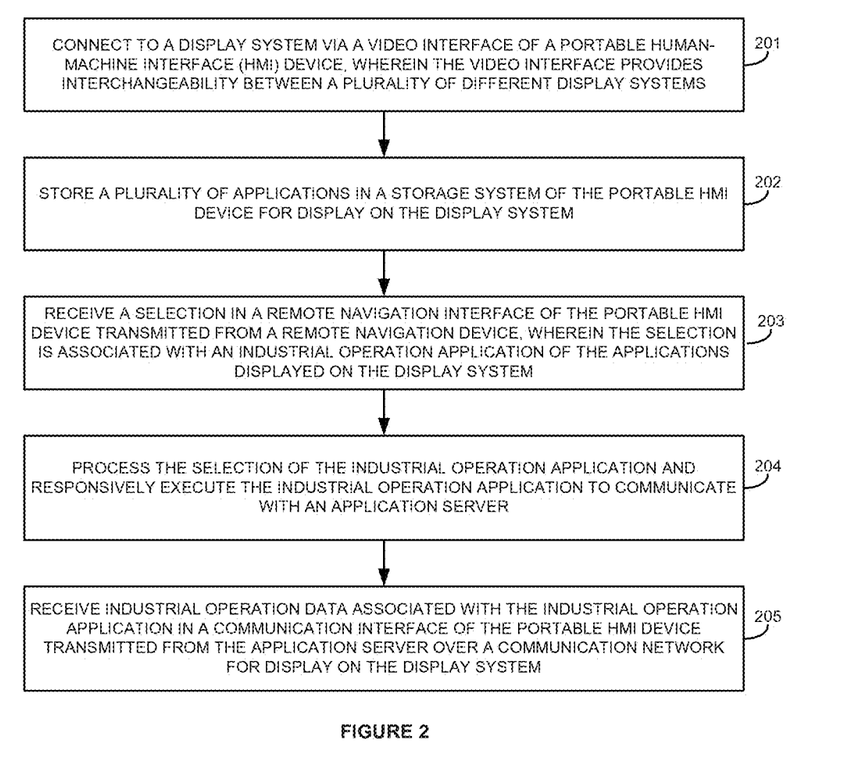
FIG. 2 is a flow diagram that illustrates an operation of a communication system in an exemplary implementation.
Figure 3:
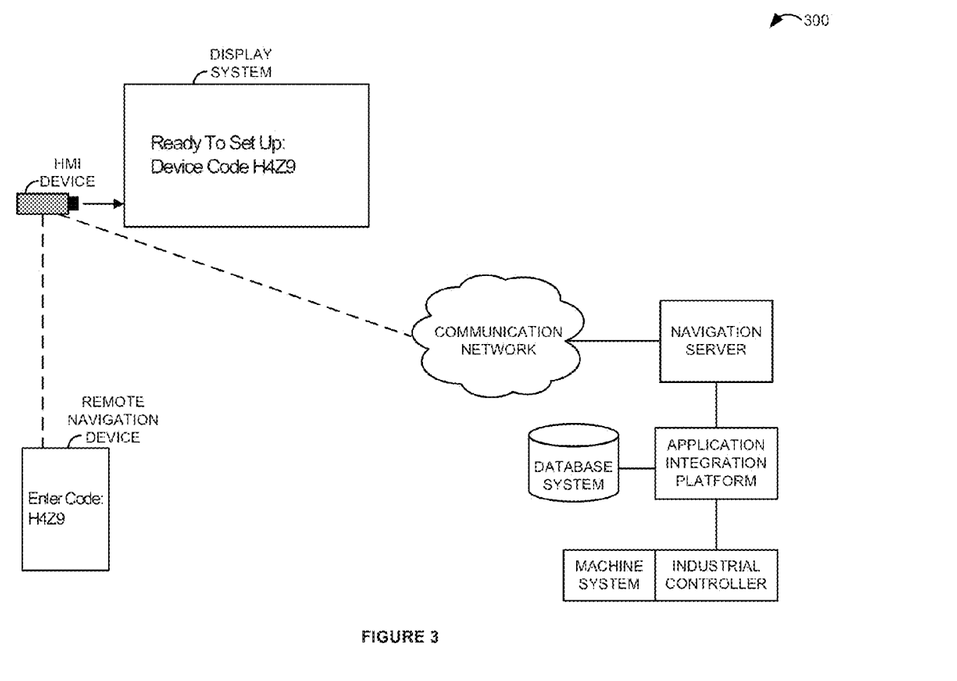
FIG. 3 is a block diagram that illustrates an operational scenario of a communication system in an exemplary implementation.
Figure 4:
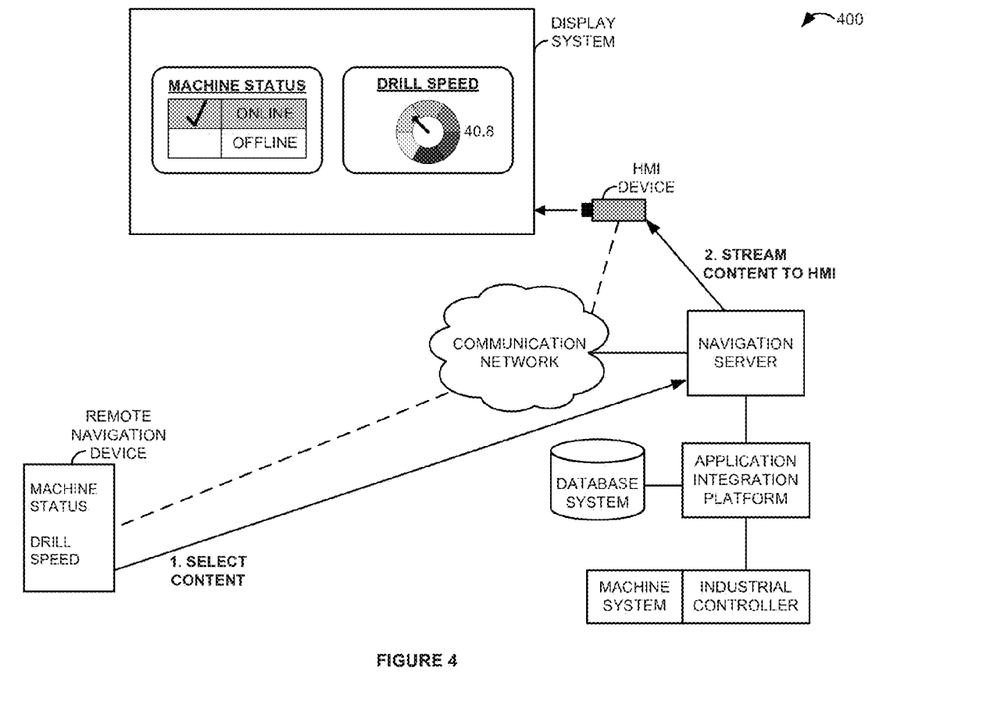
FIG. 4 is a block diagram that illustrates an operational scenario of a communication system in an exemplary implementation.
Figure 5:
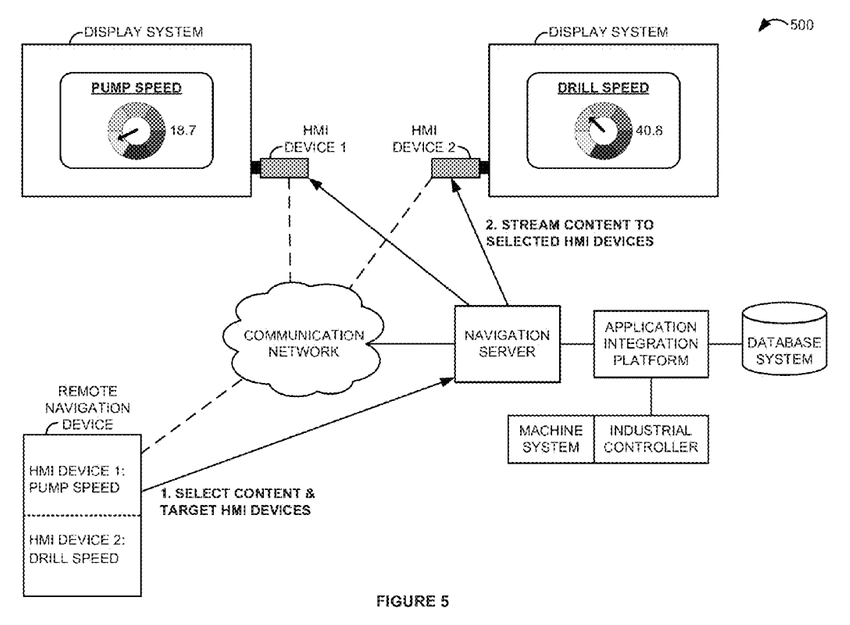
FIG. 5 is a block diagram that illustrates an operational scenario of a communication system in an exemplary implementation.
Figure 6:
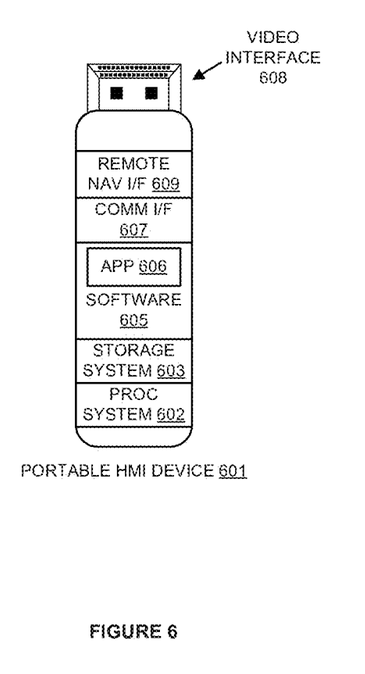
FIG. 6 is a block diagram that illustrates a portable human-machine interface (HMI) device in an exemplary implementation.
Figure 7:
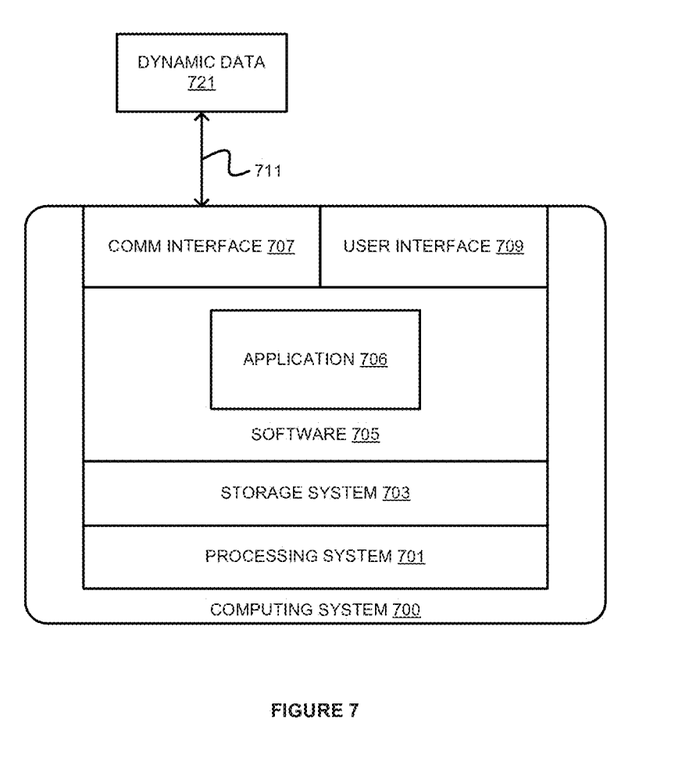
FIG. 7 is a block diagram that illustrates a computing system in an exemplary implementation.

Referring now to the drawings, FIG. 1 illustrates a communication system in an industrial automation environment, and FIG. 2 illustrates a process that employs the communication system to facilitate management and monitoring of industrial operations. FIGS. 3-5 illustrate various operational scenarios involving portable HMI devices according to different exemplary implementations. FIG. 6 illustrates an exemplary portable HMI device and FIG. 7 illustrates an exemplary computing system which may be used to perform any of the processes and operational scenarios described herein.

Turning now to FIG. 1, communication system 100 is illustrated in an industrial automation environment in an exemplary implementation. As shown in FIG. 1, communication system 100 includes portable human-machine interface (HMI) device 101, display system 110, remote navigation device 120, communication network 130, application server 140, database system 150, and machine system 160. Portable HMI device 101 comprises processing system 102, storage system 103, software 105, application 106, communication interface 107, video interface 108, and remote navigation interface 109. Video interface 108 and display system 110 are connected over link 111. Remote navigation interface 109 and remote navigation device 120 are in communication over communication link 121. Note that in some implementations, communication link 121 could be connected over a communication network, including communication network 130. Communication interface 107 and communication network 130 communicate over communication link 131. In some implementations, communication links 121 and 131 could comprise the same link. Communication network 130 and application server 140 are in communication over communication link 141. Application server 140 and database system 150 communicate over communication link 151, while application server 140 and machine system 160 communicate over communication link 161. Machine system 160 and database system 150 are in communication over communication link 171. Note that there would typically be many more machine systems in most industrial automation environments, but the number of machine systems shown in FIG. 1 has been restricted for clarity. An operation involving communication system 100 will now be described with respect to the flow diagram of FIG. 2 in one exemplary implementation.

FIG. 2 is a flow diagram that illustrates an operation of communication system 100 in an exemplary implementation. The steps of the operation are indicated below parenthetically. The following discussion of the operation of FIG. 2 will proceed with reference to elements of communication system 100 and portable HMI device 101 of FIG. 1 in order to illustrate its operations, but note that the details provided in FIG. 1 are merely exemplary and not intended to limit the scope of the operation to the specific implementation shown in FIG. 1.

The operation of FIG. 2 may be employed to operate portable HMI device 101 to facilitate management and monitoring of industrial operations in an industrial automation environment. As shown in the operational flow of FIG. 2, video interface 108 of portable HMI device 101 connects to display system 110, wherein video interface 108 provides interchangeability between a plurality of different display systems (201). Display system 110 could comprise any type of general-purpose display, such as a cathode ray tube (CRT) screen, liquid crystal display (LCD) monitor or television, organic light-emitting diode (OLED) display, plasma display panel (PDP), rear-projection television, image projector, and any other kind of display device. Video interface 108 provides interchangeability between these and other types of display systems, typically through use of standardized interfaces such as high-definition multimedia interface (HDMI), digital visual interface (DVI), video graphics array (VGA), wireless display interfaces such as Intel® WiDi and Apple® AirPlay, and any other video interface.

Storage system 103 of portable HMI device 101 stores a plurality of applications for display on display system 110 (202). The applications could be associated with different industrial automation operations, such as operational status metrics of machines, key performance indicators (KPIs), control instructions for directing the operation of machines, and any other application associated with industrial operations. In some implementations, the applications could also be associated with various system operations, such as configuration settings for portable HMI device 101, including network and server setup and access credentials. The applications could also assist in navigating through various graphical user interfaces (GUIs), display screens, and visualizations displayed by portable HMI device 101 on display system 110. In some implementations, the applications could be used to set alarms, timers, shift changes, and other conditions that trigger various responses, such as navigating to relevant content or transferring control instructions to certain machine systems. Some of the applications could also comprise streaming applications that can provide live streaming content from application server 140 for display on display system 110. A user of portable HMI device 101 can also add and remove applications from storage system 103 of portable HMI device 101 in some implementations.

Portable HMI device 101 receives a selection in remote navigation interface 109 transmitted from remote navigation device 120, wherein the selection is associated with an industrial operation application 106 of the applications displayed on display system 110 (203). Typically, a user would operate remote navigation device 120 to navigate through and select from the various applications and other visualizations displayed by portable HMI device 101 on display system 110. In some examples, remote navigation device 120 could comprise an infrared remote control, personal computer, smartphone, tablet computer, video game controller, or some other device capable of communicating wirelessly with portable HMI device 101. Remote navigation device 120 communicates with portable HMI device 101 via remote navigation interface 109, which could use Bluetooth, Wi-Fi (IEEE 802.11), infrared, cellular, or any other wireless communication protocol. The remote navigation interface 109 would typically receive the user's selection transmitted from remote navigation device 120, where the selection is associated with requesting execution, screen navigation, or some other operation associated with an industrial operation application 106. In some implementations, particularly where remote navigation device 120 comprises a computer, tablet, smartphone, or some other advanced computing device, a user could operate remote navigation device 120 to connect directly to application server 140, select the target portable HMI device 101 and the content for device 101 to display on display system 110, and trigger the navigations through the various views, screens, and other content.

Portable HMI device 101 processes the selection of the industrial operation application 106 and responsively executes industrial operation application 106 to communicate with application server 140 (204). Typically, the industrial operation application 106 is associated with a particular industrial automation plant, production line, group of machine systems, or even a specific machine, or the selection indicates the desired data source. The selection typically specifies content for retrieval, such as performance metrics, machine operational status, KPIs, charts, trend diagrams, or other content the user desires to view on display system 110. In at least one implementation, the specified content can be user-generated and/or customized and stored in the application server 140 for on-demand retrieval and use by a particular user. The selection associated with industrial operation application 106 could also include machine instructions for controlling the operation of one or more machines. Portable HMI device 101 processes the selection and responsively executes industrial operation application 106 which communicates with application server 140 to request the content, deliver machine control instructions, request new screen content for display on display system 110 in response to a navigation request, or any other action associated with the user's selection.

Communication interface 107 of portable HMI device 101 receives industrial operation data associated with industrial operation application 106 transmitted from application server 140 over communication network 130 for display on display system 110 (205). The industrial operation data received by portable HMI device from application server 140 typically comprises the content requested by the user's selection associated with industrial operation application 106 as discussed above. In some implementations, application server 140 could retrieve the requested content from database system 150 and/or machine system 160. For example, database system 150 could store historical operation data gathered over time from machine system 160 and other machine systems. In some examples, the industrial operation data could comprise a new screen for display on display system 110 that the user navigated to using remote navigation device 120, which could include various performance metrics, machine operational status reports, KPIs, charts, trend diagrams, or any other selected content. Portable HMI device 101 receives this content from application server 140 transmitted over communication network 130 and displays the received content on display system 110 for viewing by the user.

Advantageously, portable HMI device 101 is capable of interchangeably connecting to various general-purpose display systems, receiving selections and screen navigations from remote navigation device 120, and receiving content for display transmitted from application server 140 in response to the user selections. By having a small, portable form factor, such as a dongle, the ability to connect to common monitors and televisions, and the ability to receive input selections and navigations from standard mobile devices, portable HMI device 101 provides reduced hardware, setup, and operational costs over traditional HMI systems, and facilitates remote access to industrial operations. Additionally, portable HMI device 101 provides portability of industrial systems interfaces and the flexibility to adapt to fast-moving developments in display technologies.

Turning now to FIG. 3, an operational scenario of communication system 300 is illustrated in an exemplary implementation. The operational scenario of FIG. 3 shows a typical one-time setup scenario for easily and securely configuring a portable HMI device. The portable HMI device is first connected to a display system, such as a standard HDTV or monitor, typically using an HDMI connection, although other wired or wireless connections are also possible. The functionality of the HMI device could also be built-in to a display system in some implementations, similar to modern Smart TVs. Once connected, the HMI device starts a network for configuration and setup. Typically, the HMI device would communicate with a mobile device being used as a remote navigation device over a personal area network (PAN) using Bluetooth or Wi-Fi protocols, but other wireless communication scenarios are possible.

The HMI device can have a unique device code, which is shown as "H4Z9" in this example. A user of the remote navigation device could enter this code into an application in order to identify the HMI device to the target network connected to the server. The remote navigation device can be used to securely configure the HMI device with the network and server information. Once the HMI device receives the configuration data, the HMI device can disable its local network and connect to the target network for communication with the server.

Once connected to the target network, the user can navigate through various applications stored on the HMI device and select different screens and content to view on the display system. When the user navigates to a new screen or visualization, or selects to view some data associated with factory operations, the HMI device requests that content from the navigation server and the navigation server responsively provides it back to the HMI device for display on the display system. Once the navigation server is aware of the HMI device on the network, it can also be configured to send content to the HMI device automatically, such as periodically updating status metrics on predetermined intervals, providing alerts when alarms are triggered or threshold values are crossed, or event-related navigations such as shift changes. All of these unattended navigation features can be preprogrammed for a particular HMI device by a user interacting with the HMI device and the navigation server using the remote navigation device.

Typically, the navigation server would retrieve the desired content from the application integration platform, database system, or directly from a machine system and/or its industrial controller. As one example, the navigation server and/or the application integration platform could comprise a FactoryTalk® VantagePoint server system provided by Rockwell Automation, Inc. in at least some implementations. The navigation server, application integration platform, and database system could all be combined in the same computing system in some examples.

Turning now to FIG. 4, an operational scenario of communication system 400 is illustrated in an exemplary implementation. The operational scenario of FIG. 4 shows a user operating a remote navigation device to request content for delivery to a portable HMI device. However, in this example, the user is communicating directly with the navigation server to select the content for streaming to the HMI device, instead of requesting the content using applications on the HMI device that direct the HMI device to request the content. Some situations when a user may want to interact directly with the navigation server instead of the portable HMI device include when the user is not physically located at the same location as the portable HMI device and/or the display system or cannot otherwise view the display system, when the user is setting up unattended navigation rules or triggers for the navigation server to deliver content to the HMI device at later times, or for any other reason desired by the user.

In this example, the remote navigation device comprises a smartphone, tablet, laptop, or some other computing device having its own display screen. The user operates the remote navigation device to communicate with the navigation server over a communication network, such as the Internet. The remote navigation device could have applications installed thereon which the user could execute to display various configuration and content selection options for requesting content for delivery to a specified portable HMI device. Additionally or alternatively, the navigation server could provide web-based content that the user could access and view on the remote navigation device by entering a uniform resource locator (URL) into a web browser of the remote navigation device, enabling the user to input content selections and other instructions into web forms provided by the navigation server.

As shown on the display screen of the remote navigation device of FIG. 4, the user has selected the "machine status" and "drill speed" KPIs for delivery to the portable HMI device to display on its connected display system. The user would typically also identify the target HMI device in the request to the navigation server by specifying a device identifier associated with the portable HMI device, an internet protocol (IP) address, a uniform resource identifier (URI), or any other identifying information associated with the target HMI device. The user could also specify the particular machine system, assembly line, production plant, or any other data source for the requested content, along with any unattended delivery preferences such as timed intervals for receiving updated data, event triggers for delivering data or alerts such as alarms, scheduled navigations, shift changes, thresholds, or other events, and any other content delivery preferences.

Once the navigation server receives the request specifying at least the content and target HMI device, the navigation server retrieves the requested data from data sources such as the application integration platform, database system, and/or specified machine systems, and delivers the content to the target portable HMI device over the communication network. The HMI device receives the content and responsively displays the data for viewing on the display system. In this example, the "machine status" and "drill speed" content requested by the user on the remote navigation device is received and displayed by the portable HMI device, as shown on the display system of communication system 400. In some implementations, the navigation server could continually feed dynamic data to the portable HMI device for this requested content, enabling a user to view the current machine status and drill speed in real time.

Turning now to FIG. 5, an operational scenario of communication system 500 is illustrated in an exemplary implementation. The operational scenario of FIG. 5 shows a user operating a remote navigation device to request content for delivery to multiple portable HMI devices. As in FIG. 4, the user is communicating directly with the navigation server to select the content for streaming to the HMI devices. In this scenario, the user is a manager or supervisor of an industrial production plant, and is operating the remote navigation device to select various KPIs for delivery to portable HMI devices at separate remote locations.

As shown on the display screen of the remote navigation device of FIG. 5, the user has selected the desired content and the target HMI devices that are to receive the content. In particular, the user has selected the "pump speed" KPI of a specified machine system for delivery to "HMI Device 1", and the "drill speed" KPI for "HMI Device 2". The remote navigation device transmits these selections and any other display preferences or instructions for delivery to the navigation server over the communication network.

Once the navigation server receives the request specifying at least the desired content and target HMI devices, the navigation server retrieves the requested data from applicable data sources and delivers the content to the appropriate target HMI devices over the communication network. The specified portable HMI devices receive the content and responsively display the data for viewing on their respective display systems. In this example, the "pump speed" content is received and displayed by portable HMI device 1, and the "drill speed" content is received and displayed by portable HMI device 2, as shown on their associated display systems. In some implementations, the navigation server could continually feed dynamic data to the portable HMI devices for this requested content, enabling users to view the current pump speed and drill speed in real time. Also, in some implementations, the multiple HMI devices could work in concert under the control of the common navigation server, enabling coordinated navigation of multiple HMI devices at once, such as displaying content that "follows" a user or remote navigation device moving to a closest display system. The navigation server could also enable coordinated screen changes on multiple displays, either triggered manually by a user operating a remote navigation device or triggered automatically by the navigation server, such as in response to alarms, KPI value threshold crossings, shift changes, or any other events.

Now referring back to FIG. 1, portable HMI device 101 may be representative of any computing apparatus, device, or system on which the operations disclosed herein or variations thereof may be suitably implemented. Portable HMI device 101 includes processing system 102, storage system 103, software 105, application 106, communication interface 107, video interface 108, and remote navigation interface 109. In some implementations, communication interface 107, video interface 108, and remote navigation interface 109 could all utilize the same antenna or communication transceiver, and components 107-109 could all comprise the same communication interface in some examples. Processing system 102 is operatively coupled with storage system 103, communication interface 107, video interface 108, and remote navigation interface 109. Processing system 102 loads and executes software 105 from storage system 103. Software 105 includes application 106. When executed by portable HMI device 101 in general, and processing system 102 in particular, software 105 directs portable HMI device 101 to operate as described herein for the process shown in FIG. 2 or variations thereof. Portable HMI device 101 may optionally include additional devices, features, or functionality not discussed here for purposes of brevity. In some implementations, portable HMI device 101 could comprise an enclosure having a dongle form factor, wherein at least processing system 102 and storage system 103 are contained within the enclosure. A dongle is a very small form factor typically no greater than a few inches in length and capable of fitting in a human hand.

Remote navigation device 120 may be representative of any computing apparatus, device, or system on which the operations disclosed herein or variations thereof may be suitably implemented. Remote navigation device 120 provides an example of a computing system that could be used to communicate with portable HMI device 101 and/or application server 140 in some implementations. Examples of remote navigation device 120 include mobile computing devices, such as cell phones, tablet computers, laptop computers, notebook computers, and gaming devices, as well as any other type of mobile computing devices and any combination or variation thereof. Examples of remote navigation device 120 also include infrared remote controllers, desktop computers, server computers, and virtual machines, as well as any other type of computing system, variation, or combination thereof. Remote navigation device 120 may optionally include additional devices, features, or functionality not discussed here for purposes of brevity.

Communication network 130 could comprise multiple network elements such as routers, gateways, telecommunication switches, servers, processing systems, or other communication equipment and systems for providing communication and data services. In some examples, communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 130 may be configured to communicate over metallic, wireless, or optical links. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to several computer systems across a large geographic region.

Application server 140 comprises a processing system and communication transceiver. Application server 140 may also include other components such as a router, server, data storage system, and power supply. Application server 140 may reside in a single device or may be distributed across multiple devices. Application server 140 may be a discrete system or may be integrated within other systems—including other systems within communication system 100. In some examples, application server 140 could comprise a network switch, router, switching system, packet gateway, network gateway system, Internet access node, application server, database system, service node, firewall, or some other communication system, including combinations thereof. In some implementations, application server 140 could be included in industrial appliances, or could even be embedded in industrial control devices like controllers, drives, electronic operator interfaces (EOIs), network cards, and the like. As one example, application server 140 could comprise a FactoryTalk® VantagePoint server system provided by Rockwell Automation, Inc. in at least some implementations.

Database system 150 comprises a data storage system. For example, database system 150 could comprise a disk, tape, integrated circuit, solid state drive, drive array, or some other memory device, including combinations thereof. In some implementations, database system 150 could also comprise a processing system and communication transceiver. Database system 150 may also include other components such as a router, server, and power supply. Database system 150 may reside in a single device or may be distributed across multiple devices. Database system 150 may be a discrete system or may be integrated within other systems, including other systems within communication system 100. In some examples, database system 150 could comprise a database system, session initiation protocol (SIP) server, packet data serving node (PDSN), network switch, mobile switching center, router, switching system, packet gateway, network gateway system, Internet access node, application server, service node, firewall, or some other communication system, including combinations thereof.

Machine system 160 is typically located in an industrial automation environment, such as an automobile manufacturing factory, food processing plant, oil drilling operation, microprocessor fabrication facility, or some other type of industrial enterprise. Machine system 160 could comprise a sensor, drive, pump, filter, drill, motor, robot, fabrication machinery, mill, printer, or any other industrial automation equipment, including their associated control systems. A control system could comprise, for example, an industrial controller, automation controller, programmable logic controller (PLC), or any other controller used in automation control. Additionally, machine system 160 could comprise other industrial equipment, such as a brew kettle in a brewery, a reserve of coal or other resources, or any other element that may reside in an industrial automation environment.

Machine system 160 continually produces operational data over time. The operational data indicates the current status of machine system 160, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 160 and/or its associated controller system is capable of transferring the operational data over a communication link to database system 150 and application server 140, typically via a communication network.

Communication links 111, 121, 131, 141, 151, 161, and 171 use metal, air, space, optical fiber such as glass or plastic, or some other material as the transport medium—including combinations thereof. Communication links 111, 121, 131, 141, 151, 161, and 171 could use various communication protocols, such as TDM, IP, Ethernet, telephony, optical networking, hybrid fiber coax (HFC), communication signaling, wireless protocols, or some other communication format—including combinations thereof. Communication links 111, 121, 131, 141, 151, 161, and 171 could be direct links or may include intermediate networks, systems, or devices.

Referring now to FIG. 6, a portable human-machine interface (HMI) device 601 is illustrated in an exemplary implementation. Portable HMI device 601 provides an example of portable HMI device 101, although device 101 may use alternative configurations. Portable HMI device 601 includes processing system 602, storage system 603, software 605, communication interface 607, video interface 608, and remote navigation interface 609. Processing system 602 is operatively coupled with storage system 603, communication interface 607, video interface 608, and remote navigation interface 609. Processing system 602 loads and executes software 605 from storage system 603. When executed by portable HMI device 601 in general, and processing system 602 in particular, software 605 directs portable HMI device 601 to operate as described herein for the operations of FIGS. 2-5 or variations thereof. Portable HMI device 601 may optionally include additional devices, features, or functionality not discussed here for purposes of brevity.

Processing system 602 may comprise a microprocessor and other circuitry that retrieves and executes software 605 from storage system 603. Processing system 602 may be implemented within a single processing device but may also be distributed across multiple processing devices or subsystems that cooperate in executing program instructions. Examples of processing system 602 include general purpose central processing units, application specific processors, and logic devices, as well as any other type of processing device, combinations, or variations thereof.

Storage system 603 may comprise any computer-readable storage media readable by processing system 602 and capable of storing software 605. Storage system 603 may include volatile and nonvolatile, removable and non-removable media implemented in any method or technology for storage of information, such as computer-readable instructions, data structures, program modules, or other data. In addition to storage media, in some implementations storage system 603 may also include communication media over which software 605 may be communicated. Storage system 603 may be implemented as a single storage device but may also be implemented across multiple storage devices or sub-systems co-located or distributed relative to each other. Storage system 603 may comprise additional elements, such as a controller, capable of communicating with processing system 602. Some examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

Software 605 includes application 606. Application 606 could comprise an industrial operation application in some examples. Software 605 may be implemented in program instructions and among other functions may, when executed by portable HMI device 601 in general or processing system 602 in particular, direct portable HMI device 601 or processing system 602 to connect to a display system via video interface 608 of portable HMI device 601, wherein video interface 608 provides interchangeability between a plurality of different display systems. Software 605 may further direct portable HMI device 601 or processing system 602 to store a plurality of applications in storage system 603 for display on the display system. Software 605 may further direct portable HMI device 601 or processing system 602 to direct remote navigation interface 609 to receive a selection transmitted from a remote navigation device, wherein the selection is associated with an industrial operation application 606 of the applications displayed on the display system. Software 605 may further direct portable HMI device 601 or processing system 602 to process the selection of the industrial operation application 606 and responsively execute the industrial operation application 606 to communicate with an application server. Software 605 may further direct portable HMI device 601 or processing system 602 to direct communication interface 607 to receive industrial operation data associated with the industrial operation application 606 transmitted from the application server over a communication network for display on the display system. Software 605 may include additional processes, programs, or components, such as operating system software or other application software. Software 605 may also comprise firmware or some other form of machine-readable processing instructions executable by processing system 602.

In general, software 605 may, when loaded into processing system 602 and executed, transform portable HMI device 601 overall from a general-purpose computing system into a special-purpose computing system customized to facilitate management of industrial operations as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer storage media are characterized as primary or secondary storage.

In some examples, if the computer storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

Still referring to FIG. 6, communication interface 607 may include communication connections and devices that allow for communication between portable HMI device 601 and other computing systems (not shown) over a communication network or collection of networks (not shown). Examples of connections and devices that together allow for inter-system communication may include network interface cards, antennas, power amplifiers, RF circuitry, transceivers, near field communications components, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

Video interface 608 provides interchangeability between many different types of display systems, typically through use of standardized interfaces. In this implementation, video interface 608 is shown with a high-definition multimedia interface (HDMI) connector, but video interface 608 could have alternative configurations in other examples, including but not limited to digital visual interface (DVI), video graphics array (VGA), wireless display interfaces such as Intel® WiDi and Apple® AirPlay, or any other video interface, including combinations thereof.

Remote navigation interface 609 may include communication connections and devices that allow for communication between portable HMI device 601 and a remote navigation device or other computing systems (not shown). Examples of connections and devices that together allow for inter-system communication may include infrared transceivers, network interface circuitry, antennas, power amplifiers, RF circuitry, wireless transceivers, near field communications circuitry, and other communication components. The connections and devices may communicate over communication media to exchange communications with a remote navigation device or other computing systems. Remote navigation interface 609 may receive user input such as selections and navigations transmitted from a remote navigation device as described herein. Remote navigation interface 609 may share some or all of its communication components with communication interface 607 in some implementations.

Referring now to FIG. 7, computing system 700 is illustrated in an exemplary implementation. Computing system 700 provides an example of application server 140 and/or a navigation server, although these servers could use alternative configurations in other implementations. Computing system 700 also provides an example of a remote navigation device, such as remote navigation device 120, although device 120 could use alternative configurations. Computing system 700 includes processing system 701, storage system 703, software 705, communication interface 707, and optional user interface 709. Software 705 includes application 706.

Computing system 700 may be representative of any computing apparatus, system, or systems on which the operations described herein or variations thereof may be suitably implemented. Examples of computing system 700 include mobile computing devices, such as cell phones, tablet computers, laptop computers, notebook computers, and gaming devices, as well as any other type of mobile computing devices and any combination or variation thereof. Note that the features and functionality of computing system 700 may apply as well to desktop computers, server computers, and virtual machines, as well as any other type of computing system, variation, or combination thereof.

Computing system 700 includes processing system 701, storage system 703, software 705, communication interface 707, and user interface 709. Processing system 701 is operatively coupled with storage system 703, communication interface 707, and user interface 709. Processing system 701 loads and executes software 705 from storage system 703. When executed by computing system 700 in general, and processing system 701 in particular, software 705 directs computing system 700 to operate as described herein for the operations described in FIGS. 2-5 or variations thereof. Computing system 700 may optionally include additional devices, features, or functionality not discussed herein for purposes of brevity.

Referring still to FIG. 7, processing system 701 may comprise a microprocessor and other circuitry that retrieves and executes software 705 from storage system 703. Processing system 701 may be implemented within a single processing device but may also be distributed across multiple processing devices or sub-systems that cooperate in executing program instructions. Examples of processing system 701 include general purpose central processing units, application specific processors, and logic devices, as well as any other type of processing device, combinations, or variations thereof.

Storage system 703 may comprise any computer-readable media or storage media readable by processing system 701 and capable of storing software 705. Storage system 703 may include volatile and nonvolatile, removable and non-removable media implemented in any method or technology for storage of information, such as computer-readable instructions, data structures, program modules, or other data. Storage system 703 may be implemented as a single storage device but may also be implemented across multiple storage devices or sub-systems co-located or distributed relative to each other. Storage system 703 may comprise additional elements, such as a controller, capable of communicating with processing system 701. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, processing system 701 loads and executes portions of software 705, such as application 706, to facilitate management of industrial operations as described herein. In particular, when representative of application server 140, software 705 may be implemented in program instructions and among other functions may, when executed by computing system 700 in general or processing system 701 in particular, direct computing system 700 or processing system 701 to communicate with a portable HMI device and transmit industrial operation data associated with an industrial operation application for delivery to the portable HMI device over a communication network for display on a display system. When representative of remote navigation device 120, software 705 may direct computing system 700 or processing system 701 to transmit a selection for receipt by a remote navigation interface of a portable HMI device, wherein the selection is associated with an industrial operation application of a plurality of applications displayed on a display system that is connected to the portable HMI device.

Software 705 may include additional processes, programs, or components, such as operating system software or other application software. Examples of operating systems include Windows®, iOS®, and Android®, as well as any other suitable operating system. Software 705 may also comprise firmware or some other form of machine-readable processing instructions executable by processing system 701. In general, software 705 may, when loaded into processing system 701 and executed, transform computing system 700 overall from a general-purpose computing system into a special-purpose computing system customized to facilitate management and monitoring of industrial operations as described herein for each implementation. For example, encoding software 705 on storage system 703 may transform the physical structure of storage system 703. The specific transformation of the physical structure may depend on various factors in different implementations of this description. Examples of such factors may include, but are not limited to the technology used to implement the storage media of storage system 703 and whether the computer-storage media are characterized as primary or secondary storage.

In some examples, if the computer-storage media are implemented as semiconductor-based memory, software 705 may transform the physical state of the semiconductor memory when the program is encoded therein. For example, software 705 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 700 is generally intended to represent a computing system with which software 705 is deployed and executed in order to implement the operations described herein (and variations thereof). However, computing system 700 may also represent any computing system on which software 705 may be staged and from where software 705 may be distributed, transported, downloaded, or otherwise provided to yet another computing system for deployment and execution, or yet additional distribution. For example, computing system 700 could be configured to deploy software 705 over the internet to one or more client computing systems for execution thereon, such as in a cloud-based deployment scenario.

Communication interface 707 may include communication connections and devices that allow for communication between computing system 700 and other computing systems (not shown) or services, over a communication network 711 or collection of networks. In some implementations, communication interface 707 receives dynamic data 721 over communication network 711. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 709 may include a voice input device, a touch input device for receiving a gesture from a user, a motion input device for detecting non-touch gestures and other motions by a user, and other comparable input devices and associated processing elements capable of receiving user input from a user. Output devices such as a display system, speakers, haptic devices, and other types of output devices may also be included in user interface 709. The aforementioned user input devices are well known in the art and need not be discussed at length here. User interface 709 may also include associated user interface software executable by processing system 701 in support of the various user input and output devices discussed above. Separately or in conjunction with each other and other hardware and software elements, the user interface software and devices may provide a graphical user interface, a natural user interface, or any other kind of user interface. User interface 709 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A portable human-machine interface (HMI) device to facilitate management of industrial operations, the portable HMI device comprising:
    a video interface configured to connect to a display system, wherein the video interface provides interchangeability between a plurality of different display systems;
    a storage system that stores an industrial operation application for display on the display system;
    a remote navigation interface configured to receive a selection associated with the industrial operation application transmitted from a remote navigation device, wherein the selection is associated with machine control instructions that control an operation of a machine system of an industrial automation environment;
    a processing system configured to process the selection associated with the industrial operation application and responsively execute the industrial operation application to communicate with an application server and deliver the machine control instructions that control the operation of the machine system; and
    a communication interface configured to receive industrial operation data associated with the industrial operation application transmitted from the application server over a communication network for display on the display system, wherein the industrial operation data comprises machine operational data associated with the operation of the machine system as controlled by the machine control instructions.

2. The portable HMI device of claim 1 further comprising an enclosure having a dongle form factor, wherein the processing system and the storage system are contained within the enclosure.

3. The portable HMI device of claim 1 wherein the selection associated with the industrial operation application includes identification information associated with the portable HMI device.

4. The portable HMI device of claim 1 wherein the selection associated with the industrial operation application includes unattended delivery preferences for the industrial operation data.

5. The portable HMI device of claim 1 wherein the machine operational data comprises key performance indicators associated with the operation of the machine system of the industrial automation environment.

6. The portable HMI device of claim 1 wherein the video interface comprises a wireless display interface.

7. The portable HMI device of claim 1 wherein the video interface comprises a high-definition multimedia interface (HDMI).

8. A method of operating a portable human-machine interface (HMI) device to facilitate management of industrial operations, the method comprising:
    connecting to a display system via a video interface of the portable HMI device, wherein the video interface provides interchangeability between a plurality of different display systems;
    storing an industrial operation application for display on the display system;
    in a remote navigation interface of the portable HMI device, receiving a selection associated with the industrial operation application transmitted from a remote navigation device, wherein the selection is associated with machine control instructions that control an operation of a machine system of an industrial automation environment;
    processing the selection associated with the industrial operation application and responsively executing the industrial operation application to communicate with an application server and deliver the machine control instructions that control the operation of the machine system; and
    in a communication interface of the portable HMI device, receiving industrial operation data associated with the industrial operation application transmitted from the application server over a communication network for display on the display system, wherein the industrial operation data comprises machine operational data associated with the operation of the machine system as controlled by the machine control instructions.

9. The method of claim 8 wherein the portable HMI device is contained within an enclosure having a dongle form factor.

10. The method of claim 8 wherein the selection associated with the industrial operation application includes identification information associated with the portable HMI device.

11. The method of claim 8 wherein the selection associated with the industrial operation application includes unattended delivery preferences for the industrial operation data.

12. The method of claim 8 wherein the machine operational data comprises key performance indicators associated with the operation of the machine system of the industrial automation environment.

13. The method of claim 8 wherein the video interface comprises a wireless display interface.

14. The method of claim 8 wherein the video interface comprises a high-definition multimedia interface (HDMI).

15. One or more computer-readable storage media having program instructions stored thereon to facilitate management of industrial operations, wherein the program instructions, when executed by a portable human-machine interface (HMI) device, direct the portable HMI device to at least:

connect to a display system via a video interface of the portable HMI device, wherein an industrial operation application for display on the display system is stored on the portable HMI device and the video interface provides interchangeability between a plurality of different display systems;

in a remote navigation interface of the portable HMI device, receive a selection associated with the industrial operation application transmitted from a remote navigation device, wherein the selection is associated with machine control instructions that control an operation of a machine system of an industrial automation environment;

process the selection associated with the industrial operation application and responsively execute the industrial operation application to communicate with an application server and deliver the machine control instructions that control the operation of the machine system; and receive industrial operation data associated with the industrial operation application in a communication interface of the portable HMI device transmitted from the application server over a communication network for display on the display system, wherein the industrial operation data comprises machine operational data associated with the operation of the machine system as controlled by the machine control instructions.

16. The one or more computer-readable storage media of claim 15 wherein the portable HMI device is contained within an enclosure having a dongle form factor.

17. The one or more computer-readable storage media of claim 15 wherein the selection associated with the industrial operation application includes identification information associated with the portable HMI device.

18. The one or more computer-readable storage media of claim 15 wherein the selection associated with the industrial operation application includes unattended delivery preferences for the industrial operation data.

19. The one or more computer-readable storage media of claim 15 wherein the video interface comprises a wireless display interface.

20. The one or more computer-readable storage media of claim 15 wherein the video interface comprises a high-definition multimedia interface (HDMI).

* * * * *